US006204893B1

United States Patent
Lee

(10) Patent No.: US 6,204,893 B1
(45) Date of Patent: Mar. 20, 2001

(54) EEPROM AUTOMATIC SETTING METHOD AND A FUNCTION BLOCK CONTROL METHOD FOR TELEVISION

(75) Inventor: Jae Kyung Lee, Daeku (KR)

(73) Assignee: LG Electronics, Inc. (KR)

( * ) Notice: Subject to any disclaimer, the term of this patent is extended or adjusted under 35 U.S.C. 154(b) by 0 days.

(21) Appl. No.: 09/222,656

(22) Filed: Dec. 30, 1998

(30) Foreign Application Priority Data

Dec. 31, 1997 (KR) .................................................. 97-80347

(51) Int. Cl.$^7$ ....................................................... H04N 5/44
(52) U.S. Cl. .......................... 348/725; 725/714; 725/571
(58) Field of Search ................................... 348/725, 726, 348/571, 714, 553, 744

(56) References Cited

U.S. PATENT DOCUMENTS 4,914,517 * 4/1990 Duffield .............................. 348/725
4,959,260 * 9/1990 Duffield et al. ....................... 348/724

* cited by examiner

Primary Examiner—Victor R. Kostak
(74) Attorney, Agent, or Firm—Ostrolenk, Faber, Gerb & Soffen, LLP

(57) ABSTRACT

An EEPROM automatic setting method and a function block control method for a TV are disclosed. The EEPROM automatic setting method includes comparing a data of the ID checking region of the EEPROM with an ID in the ROM of the television microcomputer, and storing the data in the ROM into the regions of the EEPROM when the data of the ID checking region and the ID in the ROM are not identical as a result of the comparison for thereby providing an EEPROM with a chassis ID information, automatically loading a data from a ROM of a TV microcomputer into the EEPROM in accordance with the ID of the EEPROM and operating the TV.

3 Claims, 3 Drawing Sheets

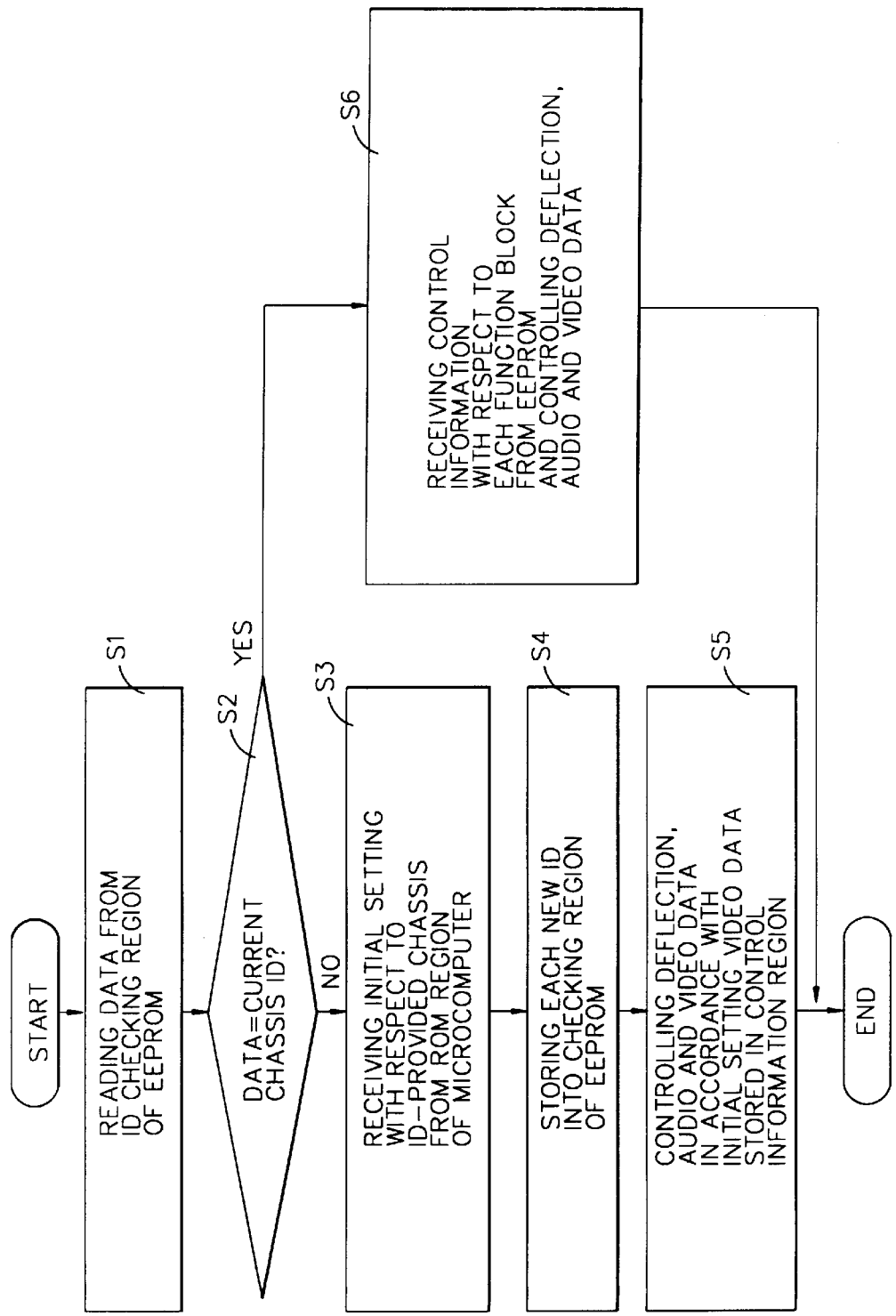

EEPROM AUTOMATIC SETTING METHOD AND A FUNCTION BLOCK CONTROL METHOD FOR TELEVISION

BACKGROUND OF THE INVENTION

1. Field of the Invention

The present invention is directed to an EEPROM (Electircally Erasable and Programmable ROM) automatic setting method and a function block control method for a TV(Television), and in particular to an improved EEPROM automatic setting method and a function block control method for a TV which are capable of automatically resetting a memory data in accordance with an ID verification by providing a region for storing a TV chassis ID into an EEPROM so that a memory data is reset when an EEPROM is in an initials state or an error information is stored for thereby operating the TV in accordance with the reset data.

2. Description of the Conventional Art

Generally, the operation of a television set (TV) is implemented by controlling a function block (which is a highly integrated circuit block) by performing various function such as a tuner operation, a deflection control, an audio process, a video process, etc. based on a microcomputer installed in the television set. The data for controlling the above-described function block are stored in a ROM installed in the TV microcomputer. These data are different in accordance with the model of the television set (hereinafter called as "chassis").

The TV includes an EEPROM(Electircally Erasable and Programmable ROM) as a memory apparatus for storing a function block control data stored in the ROM of the TV in which the control data controlling the function block may differ when producing the TV in a fabrication line or the control data may differ by a user. Therefore, the EEPROM is installed in the TV.

The above-described control data are stored in the EEPROM for being stored therein even when the TV power is not supplied. When the power is supplied again, the TV microcomputer controls various function blocks with reference to the control data stored in the EEPROM.

FIG. 1 illustrates the construction of an apparatus for controlling the function block of a conventional TV. As shown therein, the apparatus includes an EEPROM 1 for storing an initial setting data with respect to each function block when producing the TV in a fabrication line and storing a control information with respect to a recent operation environment of the TV, a ROM 2 for storing the control data corresponding with each chassis in a look-up table form, and a TV microcomputer 3 for controlling the TV with reference to the control data from the EEPROM 1 and the ROM 2. The operation of the conventional apparatus will be explained with reference to FIG. 2.

The initial setting data with respect to various function blocks and the control information with respect to the recent operation environment for a TV are stored in the EEPROM 1 when producing the TV. In this state, when an electric power is supplied to the TV, the TV microcomputer 3 reads the control data stored in the EEPROM 1. If there is not a control information with respect to the recent operation environment for a TV, each function block is controlled with reference to the initial setting data stored when the TV is produced in the factory.

When the TV is assembled in the factory, since the memory state does not correspond with a corresponding chassis, it is impossible to watch the TV. Therefore, the process for loading the data corresponding to each chassis is performed using an EEPROM. In the fabrication line, a worker loads the data corresponding to each chassis into the EEPROM and installs the data into the TV. In addition, if the EEPROM is erroneously installed during the test operation, or if a data error is found, an EEPROM is additionally provided for thereby causing much inconvenience during the fabrication process.

In addition, if the data are lost during an operation by a user, or if the EEPROM is erroneously operated, it is impossible to use the TV. In this case, a service man prepares a new EEPROM corresponding to the chassis of the TV and changes the error EEPROM with a new one, or a corresponding data should be externally downloaded.

SUMMARY OF THE INVENTION

Accordingly, it is an object of the present invention to provide an EEPROM automatic setting method and a function block control method for a TV which overcome the aforementioned problems encountered in the conventional art.

It is another object of the present invention to provide an EEPROM automatic setting method and a function block control method for a TV which are capable of providing an EEPROM with a chassis ID information, automatically loading a data from a ROM of a TV microcomputer into the EEPROM in accordance with the ID of the EEPROM and operating the TV.

To achieve the above objects, there is provided an EEPROM automatic setting method which includes comparing a data of the ID checking region of the EEPROM with an ID in the ROM of the television microcomputer, and storing the data in the ROM into the regions of the EEPROM when the data of the ID checking region and the ID in the ROM are not identical as a result of the comparison.

To achieve the above objects, there is provided a function block control method for a TV which includes comparing a data of the ID checking region of the EEPROM with an ID in the ROM of the television microcomputer, and controlling the TV function block based on the data stored in the control information region of the EEPROM after storing the data in the ROM into each region of the EEPROM when the data of the ID checking region and the ID in the ROM are not identical as a result of the comparison, and controlling the TV function block based on the data stored in the control information region of the EEPROM when the data of the ID checking region and the ID in the ROM are identical as a result of the comparison.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a flow chart illustrating an operation of the control apparatus of FIG. 3.

DETAILED DESCRIPTION OF THE PREFERRED EMBODIMENTS

The embodiments of the present invention will be explained with reference to the accompanying drawings.

Figure 1:
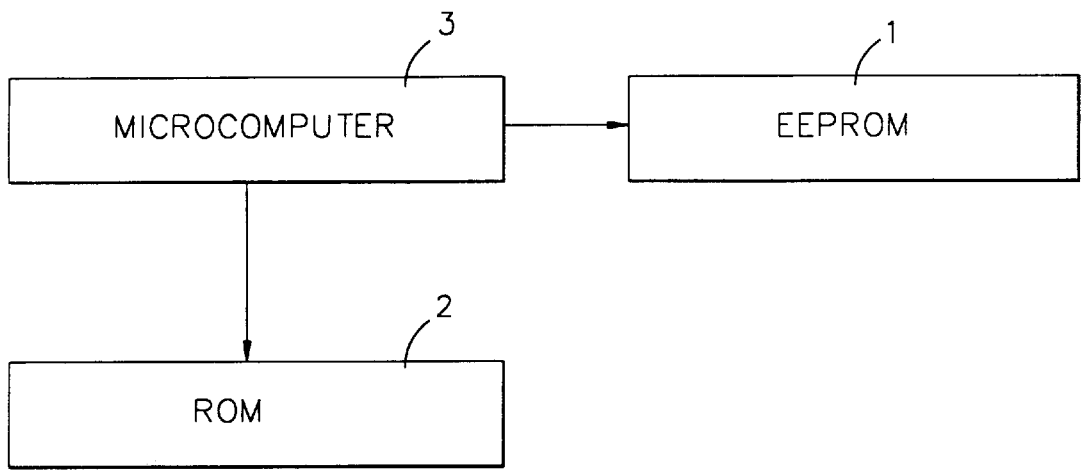
FIG. 1 is a block diagram illustrating a conventional control apparatus for a television set.
Figure 2:
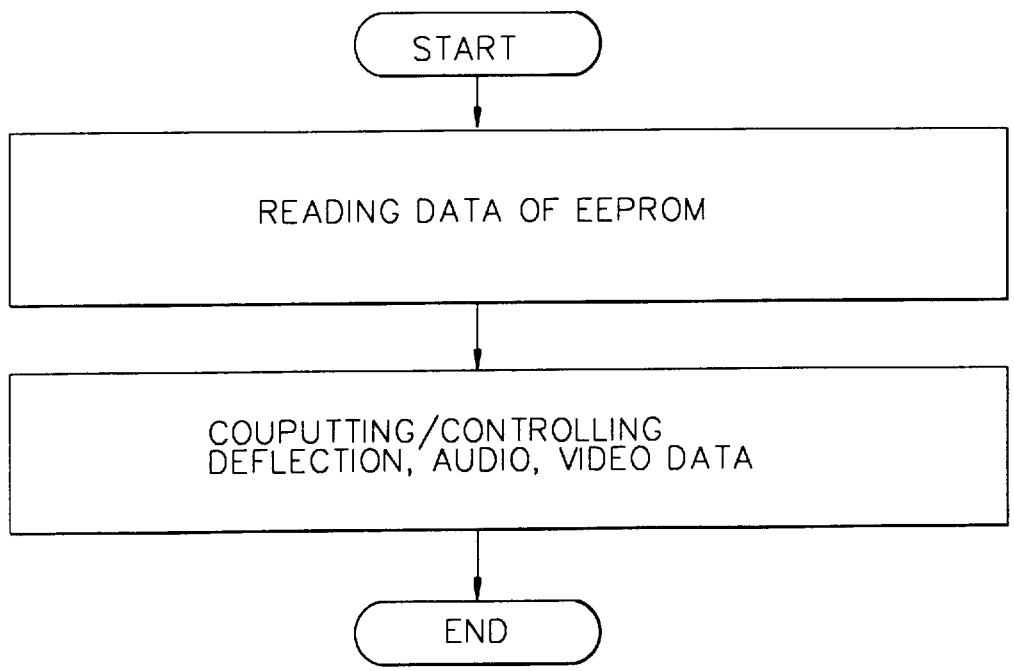
FIG. 2 is a flow chart illustrating an operation of the control apparatus of FIG. 1.
Figure 3:
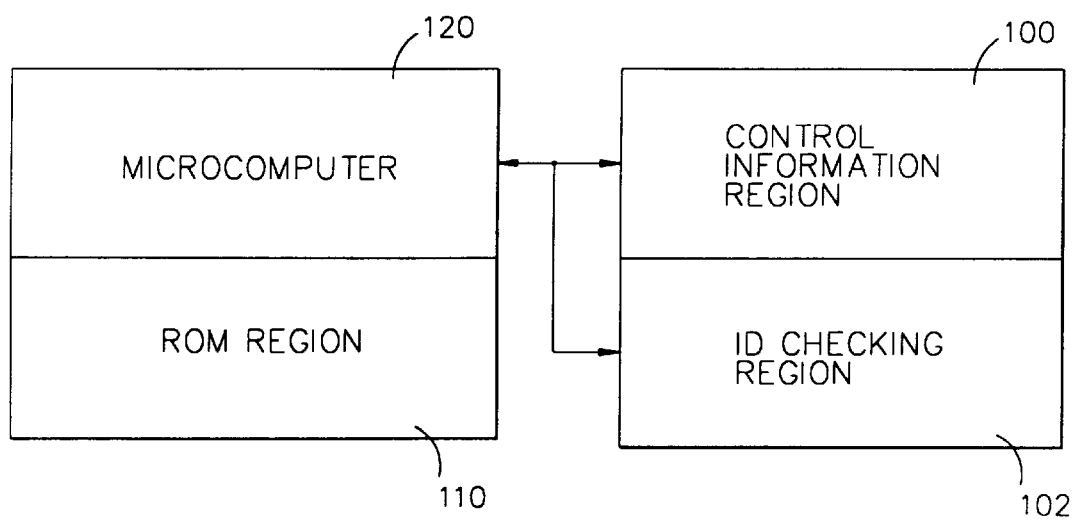
FIG. 3 is a block diagram illustrating a circuit according to the present invention.

As shown in FIG. 3, the control apparatus for controlling a function block for a TV according to the present invention includes an EEPROM(Electircally Erasable and Programmable ROM) 100 having a control information region 101 storing a control information with respect to a recent operation environment of a chassis of each ID and a control information controlling a function block of the TV and an ID checking region 101 storing a corresponding ID by providing each chassis with a corresponding chassis ID, a ROM 101 storing an initial setting data of the EEPROM 100, and a TV microcomputer 120 controlling various functions of the TV based on the information of the ID-confirmed EEPROM 100.

The operation of the circuit according to the present invention will be explained with reference to FIG. 4.

First, when an electric power is supplied to the TV, the TV microcomputer 120 reads a data from the ID checking region 102 of the EEPROM 100 in Step S1. In Step S2, the currently read ID is compared with the ID stored in the ROM 110. In Step S2, if the read ID is identical with the ID stored in the ROM, Step S6 is performed, and otherwise Step S3 is performed.

If the above-described two IDs are identical, it is judged that the data stored in the EEPROM 100 is normal in Step S6. Namely, it is judged that the data is stored in the EEPROM to be corresponded with a corresponding chassis, and various function blocks are controlled using a control information with respect to various function blocks such as a tuner control, a deflection control, a video and audio process, etc. stored in the EEPROM 100 for thereby using the TV.

However, as a result of the comparison, if the above-described two IDs are not identical, it is judged that the EEPROM 100 stores an initial state information or an error information, or the EEPROM corresponds to another chassis which is not a corresponding chassis. In this case, the TV microcomputer 120 reads an ID and a data for a function block control from the ROM 110 and stores the same into a corresponding region of the EEPROM 100.

When the data is thusly stored, in Step S5, the function blocks such as a deflection, an audio and video process, etc. are controlled in accordance with an initial setting data which is currently stored in the control information region for thereby using the TV.

As described above, in the present invention, it is possible to overcome the problems that the data should be set into the EEPROM for every chassis during a TB assembling operation. In particular, the number of service errors due to the error of the EEPROM is significantly decreased for thereby enhancing a reliability of the TV.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In a TV function block control apparatus including a TV microcomputer controlling a function block of a television, a ROM storing a control information of the ROM and an ID therein for identifying the television chassis, and an EEPROM(Electircally Erasable and Programmable ROM) having a control information region and an ID checking region for storing a control information of the ROM and the ID, respectively, for thereby being accessed by the TV microcomputer, an EEPROM automatic setting method, comprising the steps of:

comparing a data of the ID checking region of the EEPROM with an ID in the ROM of the television microcomputer; and storing the data in the ROM into the regions of the EEPROM when the data of the ID checking region and the ID in the ROM are not identical as a result of the comparison.

2. In a TV function block control method using a TV function block control apparatus including a TV microcomputer controlling a function block of a television, a ROM storing a control information of the ROM and an ID therein for identifying the television chassis, and an EEPROM having a control information region and an ID checking region for storing a control information of the ROM and the ID, respectively, for thereby being accessed by the TV microcomputer, an improved method, comprising the steps of:

comparing a data of the ID checking region of the EEPROM with an ID in the ROM of the television microcomputer; and controlling the TV function block based on the data stored in the control information region of the EEPROM after storing the data in the ROM into each region of the EEPROM when the data of the ID checking region and the ID in the ROM are not identical as a result of the comparison, and controlling the TV function block based on the data stored in the control information region of the EEPROM when the data of the ID checking region and the ID in the ROM are identical as a result of the comparison.

3. The method of claim 2, wherein said function block is formed of a block for a TV operation such as a deflection control, an audio and video process, a tuner operation, etc.

* * * * *